(12) United States Patent
Tillotson

(10) Patent No.: US 9,783,974 B1
(45) Date of Patent: Oct. 10, 2017

(54) FLUID REMOVAL SYSTEMS AND METHODS

(71) Applicant: THE BOEING COMPANY, Chicago, IL (US)

(72) Inventor: Brian J. Tillotson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/232,210

(22) Filed: Aug. 9, 2016

(51) Int. Cl.
*E03D 9/00* (2006.01)
*C02F 1/00* (2006.01)
*E03D 5/02* (2006.01)
*E03D 9/04* (2006.01)
*E03C 1/18* (2006.01)
*E03D 5/09* (2006.01)
*C02F 1/30* (2006.01)
*B64D 11/02* (2006.01)

(52) U.S. Cl.
CPC .............. *E03D 9/002* (2013.01); *B64D 11/02* (2013.01); *C02F 1/30* (2013.01); *E03C 1/18* (2013.01); *E03D 5/024* (2013.01); *E03D 5/09* (2013.01); *E03D 9/04* (2013.01)

(58) Field of Classification Search
CPC .......... B64D 11/02; E03F 1/006; E03D 11/02; C02F 1/32; A47K 11/02; A47K 13/302
USPC ......... 4/222, 316, 320, 472, 483; 250/504 R, 250/455.11, 453.11
See application file for complete search history.

(56) References Cited

U.S. PATENT DOCUMENTS

| 4,819,276 A * | 4/1989 | Stevens ............... A47K 13/302 4/233 |
| 5,980,756 A * | 11/1999 | Tracy .................... B64D 11/02 210/744 |
| 7,211,187 B2 * | 5/2007 | Lumbert .................. C02F 1/78 210/153 |
| 9,540,107 B2 * | 1/2017 | Boodaghians .......... C02F 1/008 |
| 9,623,133 B2 * | 4/2017 | Childress .................. A61L 2/24 |
| 2002/0112281 A1 * | 8/2002 | Erdmann ............... B64D 11/02 4/321 |
| 2004/0010843 A1 * | 1/2004 | Erdmann ............... B64D 11/02 4/321 |
| 2009/0038066 A1 * | 2/2009 | Kallmann .............. A47K 11/02 4/479 |

(Continued)

FOREIGN PATENT DOCUMENTS

WO WO 2014036217 3/2014

*Primary Examiner* — David A Vanore
(74) *Attorney, Agent, or Firm* — Joseph M. Butscher; The Small Patent Law Group, LLC

(57) ABSTRACT

A fluid removal system includes an operative sub-system, such as an ultraviolet (UV) light sanitizing system, that is configured to operate according to an operative cycle, such as a sanitizing cycle, and is configured to output an activation signal during the operative cycle. An actuator is operatively coupled to the operative sub-system and moveably connected to a fluid removal conduit. The fluid removal conduit is closed when the actuator is in a closed position, and opened when the actuator is in an open position. The actuator moves into the open position in response to the operative sub-system outputting the activation signal. Fluid, such as ozone, within a confined space is drawn into the fluid removal conduit when the actuator is in the open position and exhausted through an exhaust port.

22 Claims, 7 Drawing Sheets

(56) References Cited

U.S. PATENT DOCUMENTS

| | | | | |
|---|---|---|---|---|
| 2010/0275362 | A1* | 11/2010 | Biesinger | A47K 11/02 4/483 |
| 2013/0205487 | A1* | 8/2013 | Yagi | E03D 11/13 4/420 |
| 2013/0305444 | A1* | 11/2013 | Boodaghians | E03D 5/003 4/323 |
| 2014/0059796 | A1* | 3/2014 | Boodaghians | A61L 2/10 15/339 |
| 2014/0115764 | A1* | 5/2014 | Cheng | A47K 13/302 4/222 |
| 2015/0013063 | A1* | 1/2015 | Boodaghians | B61D 35/007 4/663 |

* cited by examiner

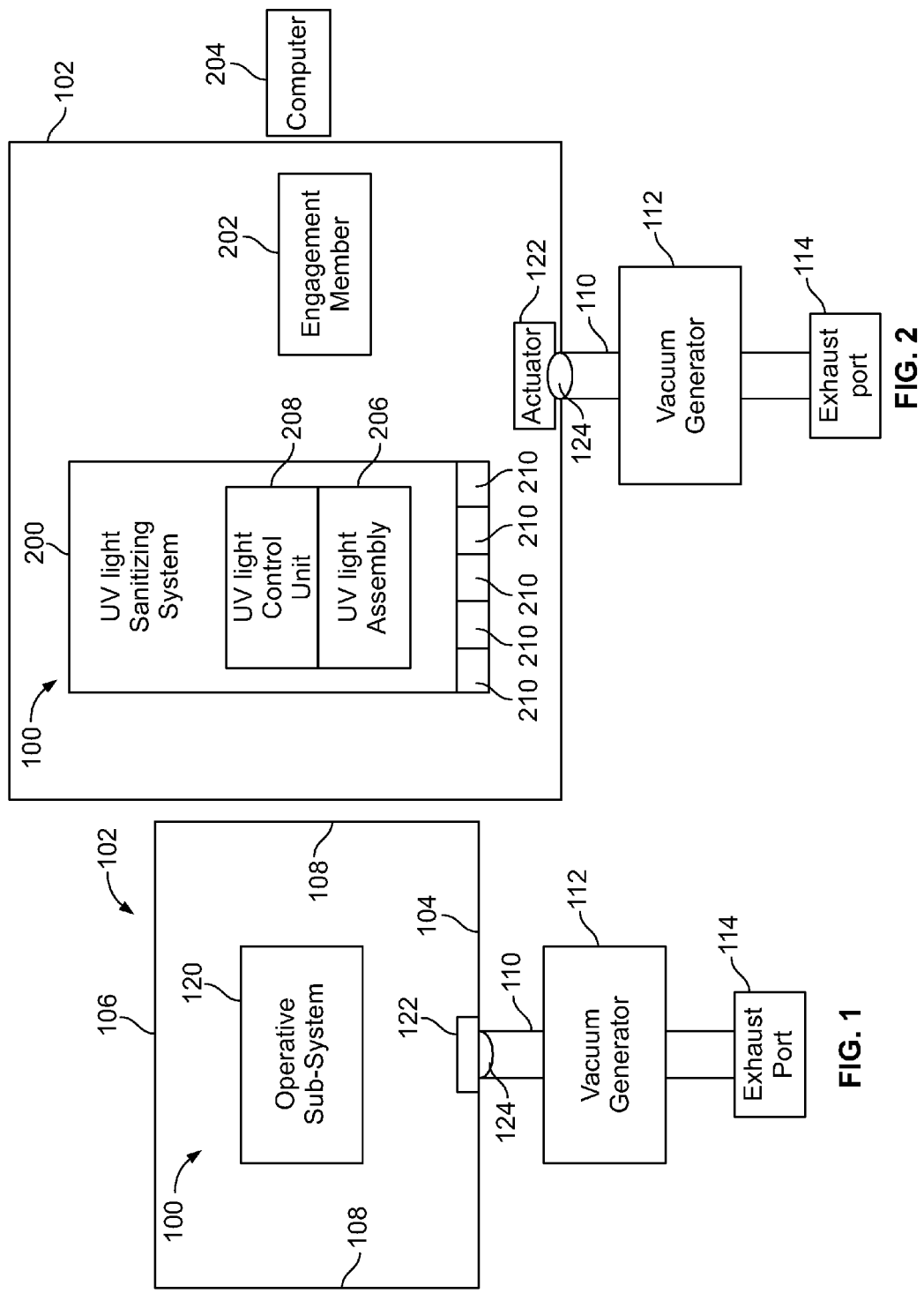

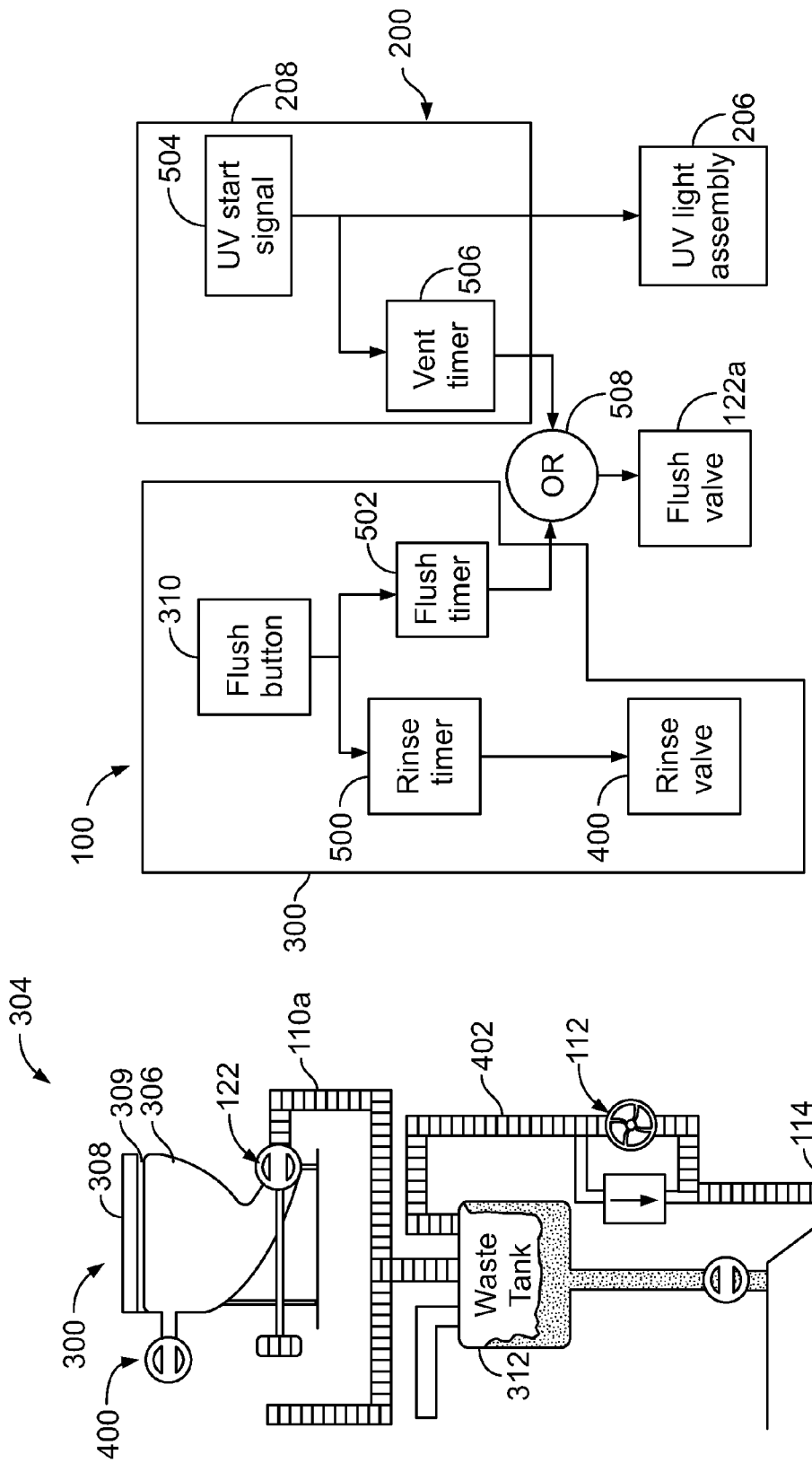

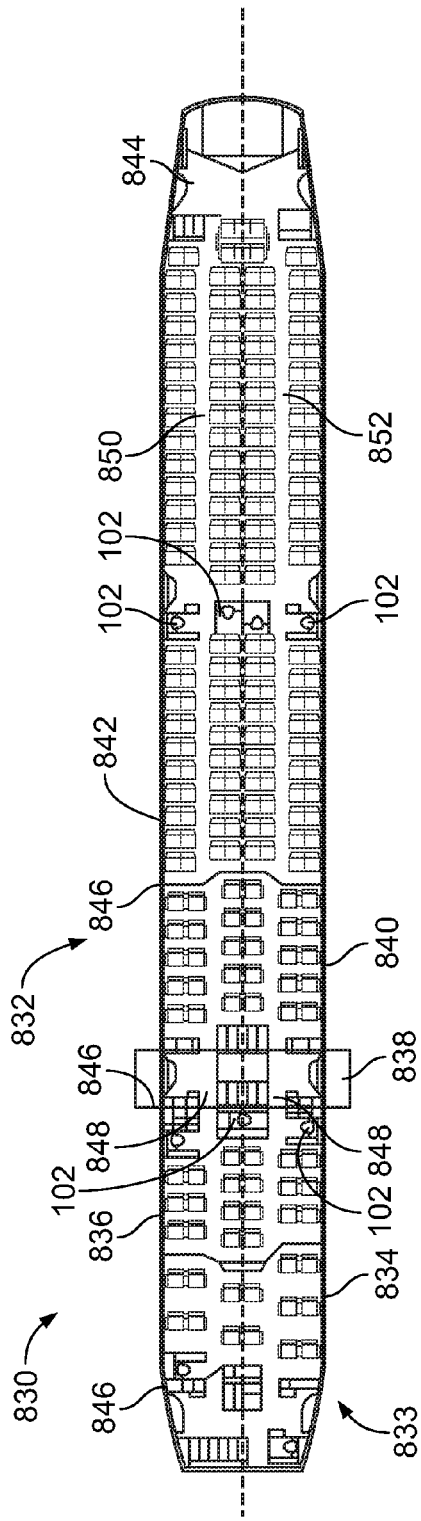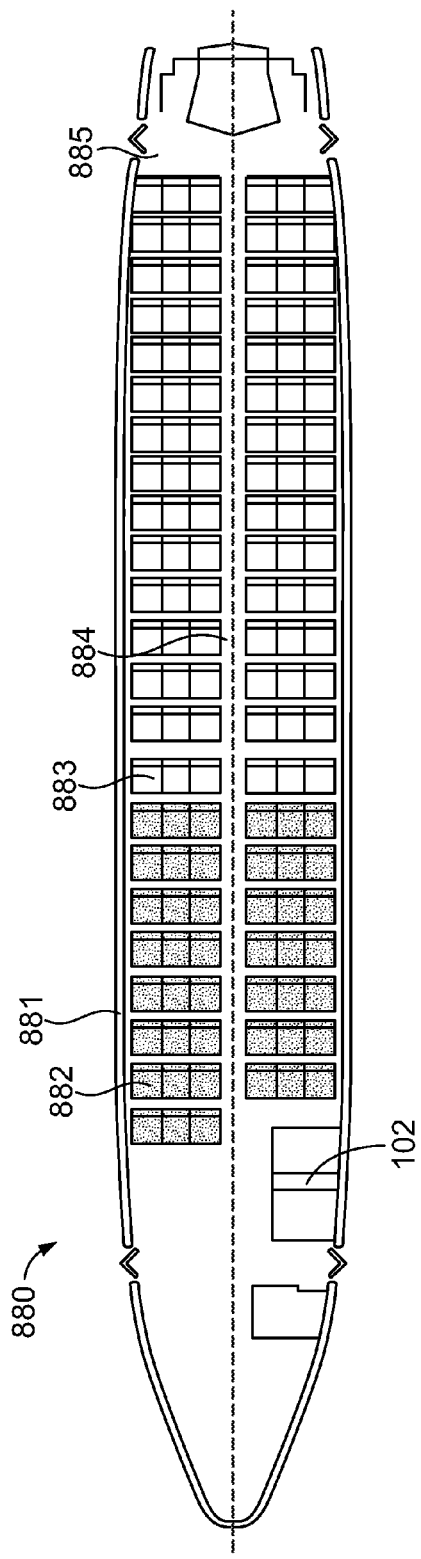
FIG. 9A
FIG. 9B

FLUID REMOVAL SYSTEMS AND METHODS

FIELD OF THE DISCLOSURE

Embodiments of the present disclosure generally relate to systems and methods for removing fluids (gases and liquids) from confined spaces, such as lavatories of commercial aircraft.

BACKGROUND OF THE DISCLOSURE

Commercial aircraft are used to transport passengers between various locations. A typical commercial aircraft includes one or more lavatories within an internal cabin.

Systems are currently being developed to disinfect or otherwise sanitize surfaces within aircraft lavatories that use ultraviolet (UV) light. For example, it has been found that far UV light efficiently disinfects exposed surfaces within a lavatory.

Interaction of UV light with air creates ozone. As the UV light passes through air, the interaction of the UV light with oxygen molecules generates ozone molecules.

Ozone is an irritant, both to individuals and structures. For example, certain individuals may be susceptible to breathing disorders from prolonged exposure to ozone. Further, ozone is a reactive gas that may degrade surfaces of various structures.

Accordingly, the amount of ozone within confined spaces is typically controlled. The Federal Aviation Administration (FAA) provides regulations and guidelines regarding the presence of ozone onboard an aircraft. For example, an FAA regulatory guideline limits the amount of ozone within an internal cabin of an aircraft to an average of 100 parts ozone per billion over an eight hour timeframe. Further, the FAA regulatory guideline also limits the amount of ozone within an internal cabin of an aircraft to 250 parts ozone per billion within a three hour peak timeframe.

Accordingly, aircraft operators seek to limit the amount of ozone within an aircraft. One known disinfecting method limits the amount of generated ozone by placing a sterilizing UV light in close proximity to a surface that is to be sterilized. For example, the UV light may be within one to six inches from a surface that is to be sterilized. The close proximity of the UV light to the surface limits ozone production, as the ozone travels through a shorter distance of ambient air. However, various structures are not able to be within such a close proximity to a UV light. For example, a UV light may not be effectively positioned within a few inches of a toilet or floor within a lavatory.

SUMMARY OF THE DISCLOSURE

A need exists for a system and method of limiting the amount of ozone within a confined space. A need exists for a system and method of ventilating ozone within a confined space. A need exists for a system and method that allow for a UV light to be separated from a structure to be sanitized, such that ozone generated by the interaction of emitted UV light with ambient air is quickly, effectively, and efficiently ventilated. A need also exists for a system and method of removing various fluids (for example, stale or malodorous air, ozone, liquids within a sink, and the like) from a confined space, such as a lavatory onboard an aircraft.

With those needs in mind, certain embodiments of the present disclosure provide a fluid removal system that is configured to remove fluid from a confined space. The fluid removal system includes an operative sub-system that is configured to operate according to an operative cycle. The operative sub-system is configured to output an activation signal during the operative cycle. An actuator is operatively coupled to the operative sub-system and moveably connected to a fluid removal conduit. The fluid removal conduit is closed when the actuator is in a closed position, and opened when the actuator is in an open position. The actuator moves into the open position in response to the operative sub-system outputting the activation signal. Fluid within the confined space is drawn into the fluid removal conduit and exhausted through an exhaust port when the actuator is in the open position.

The fluid removal system may include a vacuum generator coupled to the fluid removal conduit. The vacuum generator generates a vacuum that draws the fluid within the confined space into the fluid removal conduit when the actuator is in the open position.

In at least one embodiment, the actuator includes a flush valve of a toilet. The toilet is configured to be engaged by an individual to activate a wet flush in which a rinse valve and the flush valve are opened. In at least one embodiment, only the flush valve of the toilet is opened to provide a dry flush when the activation signal is output by the operative sub-system. In at least one other embodiment, the actuator includes one or both of a solenoid or a motor coupled to a plunger and/or a drain plug of a sink.

In at least one embodiment, the operative cycle includes a sanitizing cycle, and the fluid includes ozone within the confined space. In such an embodiment, the operative sub-system includes an ultraviolet (UV) light sanitizing system that includes a UV light control unit that is configured to output the activation signal, and a UV light assembly operatively coupled to the UV light control unit. The UV light control unit controls the UV light assembly during the sanitizing cycle based on the activation signal. The UV light assembly emits UV light to sanitize at least a portion of the confined space during the sanitizing cycle.

The fluid removal system may also include an engagement member that is configured to be manually engaged by an individual. The fluid may also include malodorous air within the confined space.

In at least one embodiment, the operative cycle includes a turbulence detection period, and the fluid includes water within the confined space. In such an embodiment, the operative sub-system may include a computer onboard an aircraft.

Certain embodiments of the present disclosure provide a fluid removal method that removes fluid from a confined space. The fluid removal method includes operating an operative sub-system according to an operative cycle, and outputting an activation signal from the operative sub-system during the operative cycle to an actuator that is operatively coupled to the operative sub-system and moveably connected to a fluid removal conduit. The fluid removal conduit is closed when the actuator is in a closed position, and opened when the actuator is in an open position. The method also includes moving the actuator into the open position in response to the outputting, and drawing fluid within the confined space into the fluid removal conduit when the actuator is in the open position. The method may also include generating a vacuum with a vacuum generator that is coupled to the fluid removal conduit. The vacuum draws the fluid within the confined space into the fluid removal conduit when the actuator is in the open position.

Certain embodiments of the present disclosure provide a vehicle including an internal cabin, and a lavatory within the internal cabin. The lavatory includes a toilet and a sink. The toilet is configured to be engaged by an individual to activate a wet flush in which a rinse valve and a flush valve are opened. At least one fluid removal conduit is coupled to one or both of the toilet and the sink. A vacuum generator is coupled to the fluid removal conduit(s). The vacuum generator is configured to generate a vacuum within the fluid removal conduit(s).

The vehicle also includes an ultraviolet (UV) light assembly within the lavatory. The UV light assembly is configured to emit UV light into or onto one or both of the toilet or the sink during a sanitizing cycle. A UV light control unit is coupled to the UV light assembly. The UV light control unit outputs an activation signal that activates and controls the UV light assembly during the sanitizing cycle.

At least one actuator is operatively coupled to the UV light control unit and moveably connected to the fluid removal conduit(s). The fluid removal conduit(s) is closed when the actuator(s) is in a closed position, and opened when the actuator(s) is in an open position. The actuator(s) moves into the open position in response to the UV light control unit outputting the activation signal. Fluid within the confined space is drawn into the fluid removal conduit(s) when the actuator(s) is in the open position. The vacuum generator generates a vacuum that draws the fluid within the confined space into the fluid removal conduit(s) when the actuator is in the open position.

An exhaust port is coupled to the fluid removal conduit(s). The fluid drawn into the fluid removal conduit(s) is exhausted out of the vehicle through the exhaust port.

BRIEF DESCRIPTION OF THE DRAWINGS

FIG. 1 illustrates a schematic diagram of a fluid removal system that is configured to remove fluids from a confined space, according to an embodiment of the present disclosure.

FIG. 2 illustrates a schematic diagram of a fluid removal system that is configured to remove fluids from a confined space, according to an embodiment of the present disclosure.

FIG. 4 illustrates a schematic diagram of a toilet connected to a waste tank and a vacuum generator, according to an embodiment of the present disclosure.

FIG. 5 illustrates a schematic control diagram of a fluid removal system, according to an embodiment of the present disclosure.

FIG. 9A illustrates a top plan view of an internal cabin of an aircraft, according to an embodiment of the present disclosure.

FIG. 9B illustrates a top plan view of an internal cabin of an aircraft, according to an embodiment of the present disclosure.

DETAILED DESCRIPTION OF THE DISCLOSURE

Figure 3:
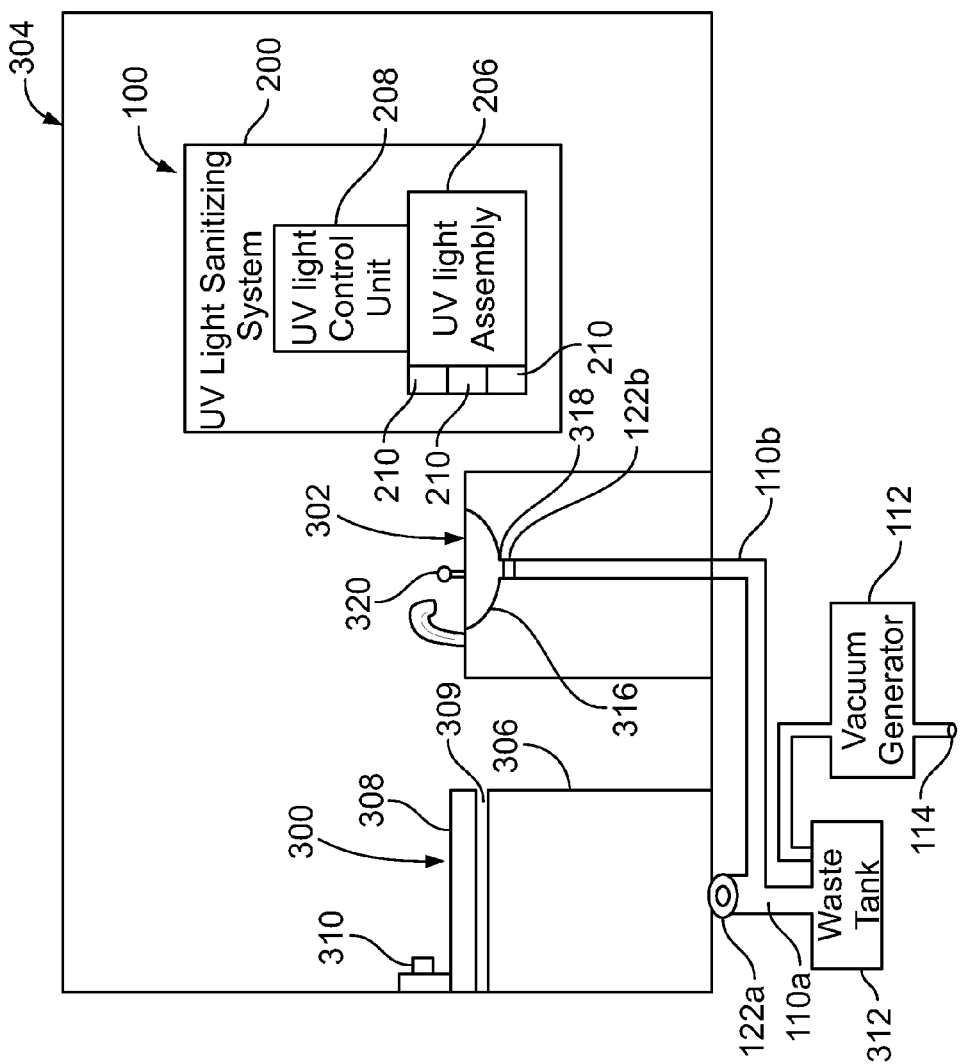
FIG. 3 illustrates a schematic diagram of a fluid removal system coupled to a toilet and sink within a lavatory, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a fluid removal system that is configured to remove one or more fluids (such as ozone, stale air, water within a sink, and the like) from a confined space, such as a lavatory onboard an commercial aircraft. The fluid removal system includes at least one operative sub-system coupled to an actuator of a fluid removal conduit, such as one or more pipes, tubes, or the like. A vacuum generator is coupled to the fluid removal conduit. For example, the vacuum generator may be disposed within the fluid removal conduit.

In at least one embodiment, the actuator is a valve within the fluid removal conduit. In at least one embodiment, the actuator is a solenoid, motor (for example, a pneumatic, hydraulic, or electric motor) coupled to a plunger and/or a drain plug within the fluid removal conduit. In a first or closed position, the actuator closes the fluid removal conduit, such that vacuum force generated by the vacuum generator does not draw fluids within the confined space into the fluid removal conduit. In a second or open position, the actuator opens the fluid removal conduit, such that the vacuum force generated by the vacuum generator draws fluids within the confined space into the fluid removal conduit. Vacuum force is generated due to surrounding higher pressure air interacting with a lower pressure volume of space (for example, a vacuum space). In short, vacuum force may be generated through a pressure imbalance.

In at least one embodiment, the operative sub-system is an ultraviolet (UV) light system that is configured to sanitize portions of the confined space through emission of UV light during a sanitizing cycle. The UV light system may be coupled to the actuator through one or more wired or wireless connections. For example, a UV light control unit that controls operation of a UV light assembly may be coupled to the actuator through one or more wired or wireless connections. As UV light control unit operates the UV light assembly to sanitize portions of the confined space, UV light emitted from the UV light assembly passes through air. The interaction of the UV light with the air may generate ozone. As such, as the UV light system is activated, the UV light control unit outputs an activation signal to the UV light assembly and the actuator. The activation signal may include an opening signal for the actuator. In at least one embodiment, the actuator may interpret (for example, be configured to be triggered by) the activation signal (which activates and controls the UV light assembly) as an opening signal. The activation signal output by the UV light control unit causes the actuator to move into the open position. As such, the fluid removal conduit is opened to the confined space, and the vacuum force generated by the vacuum generator draws fluid, including generated ozone, into the fluid removal conduit, and into an exhaust port, such as a vent that exhausts the fluid into an outside environment. Upon completion of the sanitizing cycle, the UV light system is deactivated, which, in turn, causes the actuator to move back into the closed position. In at least one embodiment, the UV light system may send a closing signal to the actuator. In at least one other embodiment, the UV light system may output the activation signal to the actuator during the sanitizing cycle, and upon completion of the sanitizing cycle, may cease sending the activation signal to the actuator, which moves the actuator back to the closed position.

The fluid removal system may include an engagement member, such as a button, lever, handle, and/or the like, that is coupled to the actuator. For example, the engagement member may be mechanically and/or electrically coupled to the actuator. The engagement member may be within the confined space, and is configured to be engaged (such as pressed, pulled, or the like) by an individual to move the actuator into the open position to remove fluid (such as stale air, water within a sink, or the like) from the confined space. For example, an individual within a lavatory may engage the engagement member to remove stale or malodorous air from the lavatory. In at least one embodiment, the engagement member is coupled to at least one actuator that is coupled to a toilet or sink. As such, the engagement member is configured to be engaged in order to remove fluids (such as ozone) through one or both of the toilet or sink, as opposed to a separate and distinct ventilation or exhaust fan (which typically has a continuous air supply and continuous air exhaust).

In at least one embodiment, the operative sub-system is a computer onboard a vehicle, such as a flight computer onboard a commercial aircraft. The computer is coupled to the actuator through one or more wired or wireless connections. The computer may output an opening signal to the actuator to open the fluid removal conduit. For example, during periods of turbulence within an aircraft, the computer may output the opening signal to the actuator so that water within a sink is removed from a lavatory, as the turbulence may otherwise cause the water within a sink to spill onto a floor of the lavatory.

Certain embodiments of the present disclosure provide a system that includes a confined space (such as a lavatory, galley, internal cabin or other space onboard a vehicle), a UV light sanitizing system, and a vacuum generator in fluid communication with a volume of air within the confined space via at least one dry inlet. Flow of fluid through the dry inlet may be controlled by a control system. The volume of air may contain a cleaning byproduct, such as ozone.

Certain embodiments of the present disclosure provide a lavatory with a dual fluid removal capability. A first fluid removal aspect is a wet flush that is used to flush the contents of a toilet. The second fluid removal aspect is a dry flush that may be used to remove some or all of the gaseous contents of the lavatory. In at least one embodiment, the dry flush is activated during a sanitizing cycle of a UV light sanitizing system.

FIG. 1 illustrates a schematic diagram of a fluid removal system 100 that is configured to remove fluids from a confined space 102, according to an embodiment of the present disclosure. The confined space 102 includes a floor 104 connected to a ceiling 106 through one or more walls 108. A door (not shown in FIG. 1) may be moveably secured to one or more of the walls 108.

A fluid removal conduit 110 is fluidly connected to the confined space 102. The fluid removal conduit 110 may be a pipe, tube, or the like that is configured to receive one or more fluids from the space. The fluid removal conduit may be plumbing (such as a waste or exhaust channel, drain, or the like) coupled to a toilet or sink.

A vacuum generator 112 is coupled to the fluid removal conduit 110. For example, the vacuum generator 112 may be disposed within the fluid removal conduit 110. The vacuum generator 112 generates a vacuum or suction force that draws one or more fluids through the fluid removal conduit 110, and into an exhaust port 114, such as a vent, through which the fluid(s) are exhausted from the confined space 102.

The fluid removal system 100 includes at least one operative sub-system 120 operatively coupled to an actuator 122, which, in turn, is coupled to the fluid removal conduit 110. The operative sub-system 120 is coupled to the actuator 122 through one or more wired or wireless electrical connections. In at least one other embodiment, the operative sub-system 120 is mechanically linked to the actuator 122, such as through one or more pivot arms, gears, pulleys, moveable tracks, chains, and/or the like. The operative sub-system 120 may be an ultraviolet light sanitizing system, a computer onboard a vehicle (such as a flight computer), and/or the like. The fluid removal system 100 may also include an engagement member (such as a button, handle, lever, or the like) within or outside of the confined space 102 that is operatively coupled to the actuator 122.

In at least one embodiment, the actuator 122 includes a valve within the fluid removal conduit 110. Optionally, or additionally, the actuator 122 includes a solenoid, motor, or the like coupled to a drain plug within and/or connected to the fluid removal conduit 110. In a closed position, the actuator 122 closes the fluid removal conduit 110, so that a fluid inlet 124 is closed in relation to the confined space 102. As such, the vacuum generator 112 is blocked by the closed actuator 122 from drawing fluids within the confined space 102 into the fluid removal conduit 110. In an open position, the actuator 122 opens the fluid removal conduit 110 to the confined space 102, so that the fluid inlet 124 is open in relation to the confined space 102. In the open position, the vacuum generator 112 draws fluids within the confined space 102 into the fluid removal conduit 110 and into an outside environment (for example outside of a vehicle in which the confined space 102 is located) through the exhaust port 114.

In operation, the operative sub-system 120 is activated. For example, the operative sub-system 120 may be a UV light sanitizing system that is activated to sanitize one or more portions of the confined space 102. An activation signal is output by the operative sub-system 120. The activation signal activates and controls operation of at least one aspect of the operative sub-system 120. As the operative sub-system 120 is activated, the operative sub-system 120 outputs an opening signal to the actuator 122. For example, the opening signal may be the activation signal output by the operative sub-system 120. In at least one embodiment, the actuator 122 moves to an open position in response to receiving the activation signal, which is otherwise configured to activate and control operation of at least one aspect of the operative sub-system 120. In response to receiving the opening signal from the operative sub-system 120, the actuator 122 opens the fluid removal conduit 110, so that fluids (such as ozone, stale/malodorous air, water, or the like) are drawn into the fluid removal conduit 110 through the vacuum force generated by the vacuum generator 112. The fluids are then drawn into and out of the exhaust port 114, such as a vent that exhaust the fluids out of the confined space 102 or structure that contains the confined space 102. As the operative sub-system 120 is deactivated, the actuator 122 moves back to the closed position, which closes the fluid removal conduit 110. For example, when the operative sub-system 120 ceases outputting the activation signal, the actuator 122 moves back to the closed position.

FIG. 2 illustrates a schematic diagram of a fluid removal system 100 that is configured to remove fluids from a confined space 102, according to an embodiment of the present disclosure. The confined space 102 may be a lavatory onboard an aircraft. As shown, the fluid removal system 100 includes an operative sub-system, such as a UV light sub-system 200, an engagement member 202, and another operative sub-system in the form of a computer 204, such as a flight computer onboard an aircraft. Optionally, the fluid removal system 100 may include more or less operative sub-systems that shown. For example, the fluid removal system 100 may include only the UV light sanitizing system 200. In at least one other embodiment, the fluid removal system 100 may include only the engagement member 202. In at least one other embodiment, the fluid removal system 100 may include only the computer 204.

The UV light sanitizing system 200 includes a UV light assembly 206 operatively coupled to a UV light control unit 208. The UV light assembly 206 may include one or more UV light elements 210 (such as light emitting diodes (LEDs), bulbs, fiber optic elements, and/or the like that are configured to emit UV light onto one or more structures within the confined space during a sanitizing cycle. In at least one embodiment, the UV light elements 210 are configured to emit far UV light. Alternatively, the UV light elements 210 may be configured to emit other types of UV light, such as UVC, UVB, or UVA light.

The UV light control unit 208 is coupled to the UV light assembly 206 through one or more wired or wireless connections, and is configured to control operation of the UV light assembly 206. The UV light control unit 208 outputs an activation signal that is received by the UV light assembly 206. The activation signal activates and controls the UV light assembly 206 during a sanitizing cycle in which the UV light assembly 206 emits UV light onto one or more structures within the confined space 102. The UV light control unit 208 may include or otherwise be coupled to a memory that stores data regarding the sanitizing cycle.

The UV light sanitizing system 200 is also coupled to the actuator 122, such as through one or more wired or wireless connections. As the UV light sanitizing system 200 is activated during a sanitizing cycle, the UV light control unit 208 outputs the activation signal to the actuator 122. The activation signal may include a separate opening signal for the actuator. In at least one embodiment, the actuator 122 is simply triggered into an open position by the activation signal, which is otherwise configured to activate and control the UV light assembly 206. As such, the activation signal itself is the opening signal. In response to receiving the opening signal, the actuator 122 opens the fluid removal conduit 110 so that ozone generated by interaction of the UV light with air inside the confined space 102 is drawn into the fluid removal conduit 110 through the open fluid inlet 124 via the vacuum force generated by the vacuum generator 112. The vacuum generator 112 draws the ozone within the fluid removal conduit 110 into the exhaust port 114, through which the ozone is exhausted into an outside environment. Upon deactivation of the UV light sanitizing system 200, the UV light control unit 208 ceases outputting the opening signal to the actuator 122, thereby closing the fluid removal conduit 110.

As described above, activation of the UV light sanitizing system 200 causes the actuator 122 to open the fluid removal conduit 110 so that ozone is removed from the confined space 102 via the fluid removal conduit 110. Optionally, the engagement member 202 may be manually engaged by an individual to move the actuator 122 into the open position. For example, the engagement member 202 may be manually engaged by an individual to open the actuator 122 so that stale or malodorous air, water, or the like may be removed from the confined space 102. The engagement member 202 may be within the confined space 202, or outside of the confined space 102 (such as mounted on a door or outer wall surface of the confined space 102).

The engagement member 202 is operatively coupled to the actuator 122. For example, the engagement member 202 may be electrically coupled to the actuator 122 through one or more wired or wireless connections. In at least one other embodiment, the engagement member 202 may be mechanically coupled to the actuator 122 through one more mechanical links, such as pivot arms, pulleys, gears, chains, mechanical tracks, and/or the like.

In operation, when an individual desires to ventilate, exhaust or otherwise remove fluids (such as stale and/or malodorous air) from the confined space 102 (and replace the removed fluid with fresh air, such as from an air supply and/or a main cabin volume of air, for example), the individual engages the engagement member 202, such as by pushing a button, pulling a lever, or the like. In response to such engagement by the individual, the engagement member 202 opens the actuator 122 (such as through outputting an opening signal). The actuator 122 then opens the fluid removal conduit 110, so that the fluids are drawn out of the confined space 102 and exhausted out of the exhaust port 114. In at least one embodiment, the engagement member 202 may send an electrical opening signal to the actuator 122, which causes the actuator 122 to remain in the open position for a predetermined amount of time (such as ten seconds or less).

In at least one embodiment, the engagement member 202 is coupled to at least one actuator 122 that is coupled to a toilet or a sink. In this manner, the engagement member 202 may be manually engaged to remove fluids from the confined space 102 through the toilet and/or the sink, instead of a separate and distinct ventilation fan (which is typically incapable of a fast air flush).

As described above, the actuator 122 may be moved into an open position through activation of the UV light sanitizing system 200, and/or through the engagement of the engagement member 202. As noted, the fluid removal system 100 may also include a remote computer 204 operatively coupled to the actuator 122. For example, the remote computer 204 may be a computer onboard a vehicle, such as a flight computer onboard an aircraft. The computer 204 is operatively coupled to the actuator 122, such as through one or more wired or wireless connections. The computer 204 may automatically send an opening signal (such as an activation signal related to vehicle operation) to the actuator 122 based on predetermined criteria. For example, the computer 204 may determine the existence of turbulence in proximity to the aircraft, which may then cause the computer 204 to output the opening signal to the actuator 122, which, in turn, opens the fluid removal conduit 110. Fluid such as water within a sink of a lavatory (an example of the confined space 102) may then be drawn into the opened fluid removal conduit 110 via the vacuum force generated by the vacuum generator 112, and removed from the confined space 102, as described above. In this manner, when the aircraft is subjected to turbulence, water within a sink may be drawn out of the confined space 102, instead of spilling onto a floor of the confined space 102. In at least one other embodiment, an individual may input an opening signal into the computer 204 through an input device (such as a keyboard, mouse, touchscreen, or the like) in order to move the actuator 122 into the open position to remove fluid(s) from the confined space 102, as desired.

Optionally, the fluid removal system 100 may include less than all three of the UV light sanitizing system 200, the engagement member 202, and the computer 204.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the UV light control unit 208 and the computer 204 may be or include one or more processors.

The UV light control unit 208 and the computer 204 are configured to execute a set of instructions that are stored in one or more data storage units or elements (such as one or more memories), in order to process data. For example, the UV light control unit 208 and the computer 204 may each include or be coupled to one or more memories. The data storage units may also store data or other information as desired or needed. The data storage units may be in the form of an information source or a physical memory element within a processing machine.

The set of instructions may include various commands that instruct the UV light control unit 208 and the computer 204 as processing machines to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the UV light control unit 208. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the UV light control unit 208 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

FIG. 3 illustrates a schematic diagram of a fluid removal system 100 coupled to a toilet 300 and sink 302 within a lavatory 304, according to an embodiment of the present disclosure. The lavatory 304 is an example of the confined space 102 (shown in FIGS. 1 and 2). In this embodiment, the operative sub-system is the UV light sanitizing system 200, as shown and described in FIG. 2.

The toilet 300 includes a housing 306 (for example, a bowl, or a structure supporting the bowl) and a cover 308 (for example, a seat and/or lid) moveably secured to the housing 306. When the cover 308 is closed, an air gap 309 is formed between the housing 306 and the cover 308. The toilet 300 also includes a flush button 310 that is configured to be pressed to flush the contents of an internal bowl of the housing 306. When the flush button 310 is pressed, water rinses the internal bowl of the housing 306 with water and an actuator 122a, such as a valve, is moved into an open position so that vacuum force generated by the vacuum generator 112 draws contents of the bowl into a waste tank 312 via a fluid removal conduit 110a coupled to the toilet 300. The actuator 122a is also operatively coupled to (such as in communication with) the UV light control unit 208 of the UV light sanitizing system 200.

As noted, when an individual presses the flush button 310 to flush the toilet, water rinses the internal bowl, and the actuator 122a (for example, a valve) is moved into an open position so that the contents of the internal bowl are drawn into the waste tank 312 via the fluid removal conduit 110a. During a UV light sanitizing cycle (such as when no individuals are within the lavatory 304), the UV light sanitizing system 200 outputs the activation signal to the actuator 122a, such as via the UV light control unit 208, as described above. Upon reception of the activation signal, the actuator 122a is moved into an open position, which opens the fluid removal conduit 110a, and the vacuum force generated by the vacuum generator 112 draws gases (such as ozone generated during the UV sanitizing cycle) within the lavatory 304 through the air gap 309 into the fluid removal conduit 110a. The gases are then exhausted through the exhaust port 114, such as vent.

Notably, during the sanitizing cycle, the opening signal is sent to the actuator 122a (such as a valve) coupled to the toilet 300. However, the opening signal does not affect the flush button 310 of the toilet 300. That is, the opening signal output by the UV light sanitizing system 200 does not activate the flush button 310 or a rinse valve of the toilet 300. In this manner, during a sanitizing cycle, the UV light sanitizing system 200 activates a dry flush that draws gases into the toilet 300 through the air gap 309, and out of the lavatory 304 through the opened fluid removal conduit 110a without causing water to rinse the internal bowl of the toilet 300.

The sink 302 includes a basin 316 having a drain 318 that connects to a fluid removal conduit 110. A plunger 320 (coupled to a drain plug) is configured to be selectively moved between open and closed positions. In the closed position, the plunger 320 closes the drain 318 so that water is retained within the basin 316. In the open position, the plunger 320 opens the drain 318 so that water is drained through the drain 318 and into the fluid removal conduit 110b.

An actuator 122b may be coupled to the plunger 320. The actuator 122b may be or include a solenoid, an electric motor, a pneumatic motor, a hydraulic motor, or the like that is operatively coupled (for example, in communication with) the UV light control unit 208 of the UV light sanitizing system 200. Optionally, the actuator 122b may be operatively coupled to an engagement member (such as the engagement member 202 shown in FIG. 2), and/or a computer (such as the computer 204 shown in FIG. 2).

During the sanitizing cycle, the UV light sanitizing system 200 outputs the activation signal to the actuator 122b coupled to the drain 318 of the sink 302. As such, gases (such as ozone) within the lavatory 304 are drawn into the drain 318 and to the fluid removal conduit 110b via the vacuum force generated by the vacuum generator 112. The gases are then exhausted through the exhaust port 114.

Optionally, the UV light sanitizing system 200 may be operatively coupled to (for example, in electrical communication with) only the actuator 122a. In at least one other embodiment, the UV light sanitizing system 200 may be operatively coupled to only the actuator 122b.

As shown in FIG. 3, the fluid removal conduit 110a may be an existing waste removal conduit coupled to the toilet 300. Similarly, the fluid removal conduit 110b may be an existing drain channel coupled to the sink 302. Alternatively, the fluid removal conduit 110a may be separate and distinct from an existing waste removal conduit coupled to the toilet 300. Also, alternatively, the fluid removal conduit 110b may be separate and distinct from an existing drain channel coupled to the sink 302.

The UV light control unit 208 outputs a control signal (for example, the activation signal) that operates the UV light assembly 206 during a sanitizing cycle. The activation signal provides an opening signal that causes the actuator 122a and/or the actuator 122b to open. In the open position, the actuators 122a and 122b open the respective fluid removal conduits 110a and 110b, thereby allowing fluids within the lavatory 304 to be drawn into the fluid removal conduits 110a and 110b and removed from the lavatory 304 (and which may then be exhausted through the exhaust port 114).

When the UV light sanitizing system 100 operates during a sanitizing cycle to sanitize one or more portions (for example, the toilet 300 and the sink 302) of the lavatory 304, the actuator 122a is in the open position, so that the toilet 300 activates an air-only flush (that is, a dry flush). In at least one embodiment, the UV light elements 210 direct UV light onto the toilet seat (for example, the cover 308). As such, most or all of any generated ozone may be proximate to the toilet 300. The vacuum force generated by the vacuum generator 112 draws gases (including air and ozone) into the internal bowl of the toilet 300 and into the fluid removal conduit 110a, thereby ensuring that most or all of any generated ozone is removed from the lavatory 304 before diffusing or circulating to other parts of the lavatory 104. As such, the fluid removal system 100 quickly, efficiently, and effectively removes ozone from the lavatory 304 without the use of filters or specialized pumps.

In at least one embodiment, the dry flush occurs while the UV light assembly 206 emits UV light, and/or for a fixed, preset amount of time after emission of the UV light. In at least one embodiment, the dry flush begins when the UV light assembly 206 is active (that is, when UV light is emitted) and continues, even after the UV light assembly 206 is deactivated, until one or more ozone sensors in the lavatory 304 detect a safe level of ozone within the lavatory 304.

In contrast to a separate and distinct dedicated vent, the fluid removal system 100 shown and described with respect to FIG. 3 is cheaper, lighter, and does not require installation of an extra conduit for removal of air from inside the cabin to outside. Further, the fluid removal system 100 reduces the amount of fluid that is dumped overboard (or filtered) because the fluid may be removed from locations proximate to ozone generation during a sanitizing cycle. Further, the fluid removal system 100 automatically removes ozone from the lavatory 304 during a sanitizing cycle, and, as such, may ensure that ozone within the lavatory 304 is kept to nonexistent, minimal, or otherwise safe levels, without the need for separate and distinct ozone sensors to detect ozone levels. Also, the dry flush removes ozone from the lavatory 304 without using any water.

FIG. 4 illustrates a schematic diagram of the toilet 300 connected to the waste tank 312 and the vacuum generator 112, according to an embodiment of the present disclosure. As shown, the actuator 122a may be a flush valve coupled to the toilet 300. The toilet 300 may also include a rinse valve 400 which is activated when the toilet 304 when the flush button 310 is pressed, for example. When the rinse valve 400 is opened, water from a water source (such as a tank onboard a vehicle) rinses the internal bowl of the housing 306. An operative sub-system, such as the UV light sanitizing system 200 (shown in FIGS. 2 and 3) is operatively coupled to the flush valve actuator 122a, but not the rinse valve 400. Therefore, when an individual flushes the toilet 300, the rinse valve 400 and the flush valve actuator 122a are opened so that the contents of the internal bowl are drawn into the waste tank 312 through vacuum force generated by the vacuum generator 112. However, when the operative sub-system is activated, only the flush valve actuator 122a is opened, thereby activating a dry flush of the toilet 300 via the opened flush valve actuator 122a. During the dry flush when the flush valve actuator 122a is opened and the rinse valve 400 is closed, gases proximate to the toilet 300 are drawn into the internal bowl through the air gap 309 and into the opened fluid removal conduit 122a through the vacuum force generated by the vacuum generator 112. The gases within the fluid removal conduit 110 are then exhausted through the exhaust port 114, which may be part of the fluid removal conduit 110, or connected to the fluid removal conduit 110 through an exhaust conduit 402.

FIG. 5 illustrates a schematic control diagram of a fluid removal system 100, according to an embodiment of the present disclosure. As shown, the flush button 310 of the toilet 300 may be coupled to a rinse timer 500 that controls the rinse valve 400 (shown in FIG. 4), and a flush timer 502 that controls the flush valve actuator 122a (shown in FIG. 3). When pressed, the flush button 310 initiates both the rinse timer 500 (which opens the rinse valve 400) and the flush timer 502 (which opens the flush valve actuator 122a), so that the toilet 300 is rinsed and contents within the internal bowl are removed, as described above.

In contrast, when the UV sanitizing system 200 is activated, the UV light control unit 208 outputs an activation signal 504 that activates and controls the UV light assembly 206 during a sanitizing cycle, and also initiates a vent timer 506 that opens the flush valve 122a, as described above, for a predetermined period of time. The activation signal output by the UV light control unit 208 is not sent to the rinse timer 500. As such, the activation signal output by the UV light control unit 208 does not open the rinse valve 400. Instead, the activation signal output by the UV light control unit 208 initiates a dry flush, in which water does not rinse the internal bowl of the toilet 300.

The vent timer 506 of the UV light control unit 208 and the flush timer 502 of the toilet 300 may be coupled to the flush valve 122a through an OR gate 508. As such, when either the flush timer 502 or the vent timer 506 is activated, the flush valve 122a is opened.

As shown, the flush timer 502 and the vent timer 506 may be separate and distinct. Alternatively, the flush timer 502 and the vent timer 506 may be the same timer.

Each timer may be part of a toilet system or the UV light sanitizing system. In at least one embodiment, each timer may be or include a processor, a monostable vibrator, an RC circuit, a digital timer, or the like coupled to the toilet system or the UV light sanitizing system.

Figures 6, 7:
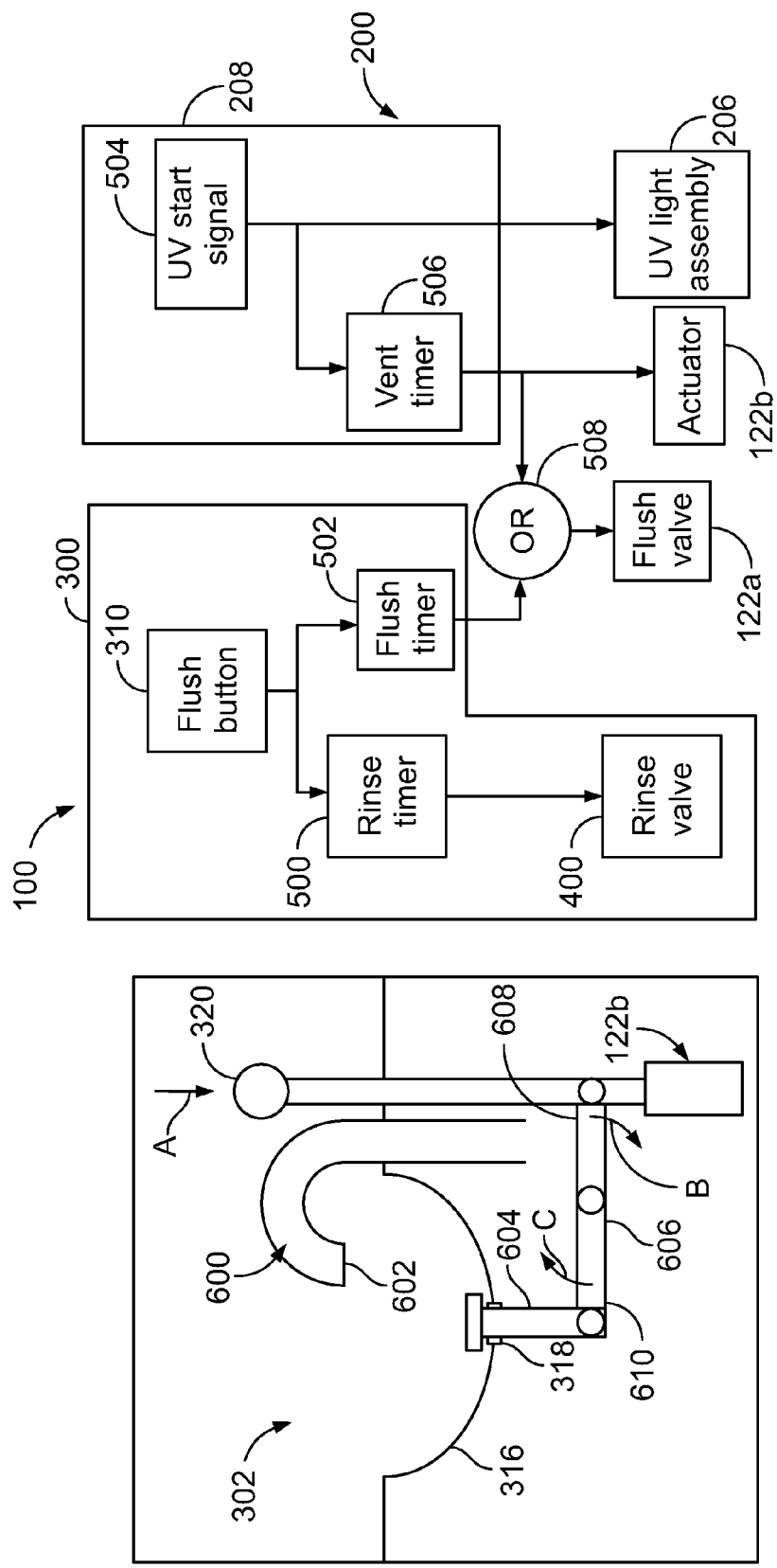
FIG. 6 illustrates a simplified lateral view of a sink, according to an embodiment of the present disclosure.
FIG. 7 illustrates a schematic control diagram of a fluid removal system, according to an embodiment of the present disclosure.

FIG. 6 illustrates a simplified lateral view of the sink 302, according to an embodiment of the present disclosure. A faucet 600 is operated to allow water to flow out of an outlet 602 and into the basin 316.

The plunger 320 connects to a drain plug 604 through a pivot link arm 606. As an individual pushes the plunger 320 down in the direction of arrow A, a plunger end 608 of the arm 606 that is pivotally connected to the plunger 608 pivots downwardly in the direction of arc B, while the plug end 610 pivots upwardly in the direction of arc C, thereby causing the drain plug 604 to unseat from the basin 316 and open the drain 318. When the drain 318 is opened, water within the basin 316 drains therethrough. Further, as described above, gases proximate to the sink 302 may be drawn into the drain 318 (and into a fluid removal conduit), as described above. As such, the plunger 320 may be manually operated to selectively open and close the drain 318.

In at least one embodiment, the actuator 122b is also connected to the plunger 320 and/or the drain plug 604. The actuator 122b may be a solenoid, a motor, or the like that is configured to automatically open the drain 318. The actuator 122b is in communication with an operative sub-system, such as the UV light sanitizing system 200 shown in FIGS. 2 and 3. As described above, the UV light sanitizing system 200 outputs the activation signal, which may be received by the actuator 122b. In response, the actuator 122b actuates the plunger 320 to move the drain plug 604 to open the drain 318.

FIG. 7 illustrates a schematic control diagram of a fluid removal system 100, according to an embodiment of the present disclosure. As shown, the vent timer 506 may be coupled to both the flush valve actuator 122a and the actuator 122b, such as through the OR gate 508. Thus, when the UV activation signal 504 is output by the UV light control unit 208, the opening signal is output to both the flush valve actuator 122 and the actuator 122b. Alternatively, the UV light sanitizing system 200 may be operatively coupled to only the actuator 122b, but not the flush valve actuator 122a, or vice versa.

Figure 8:
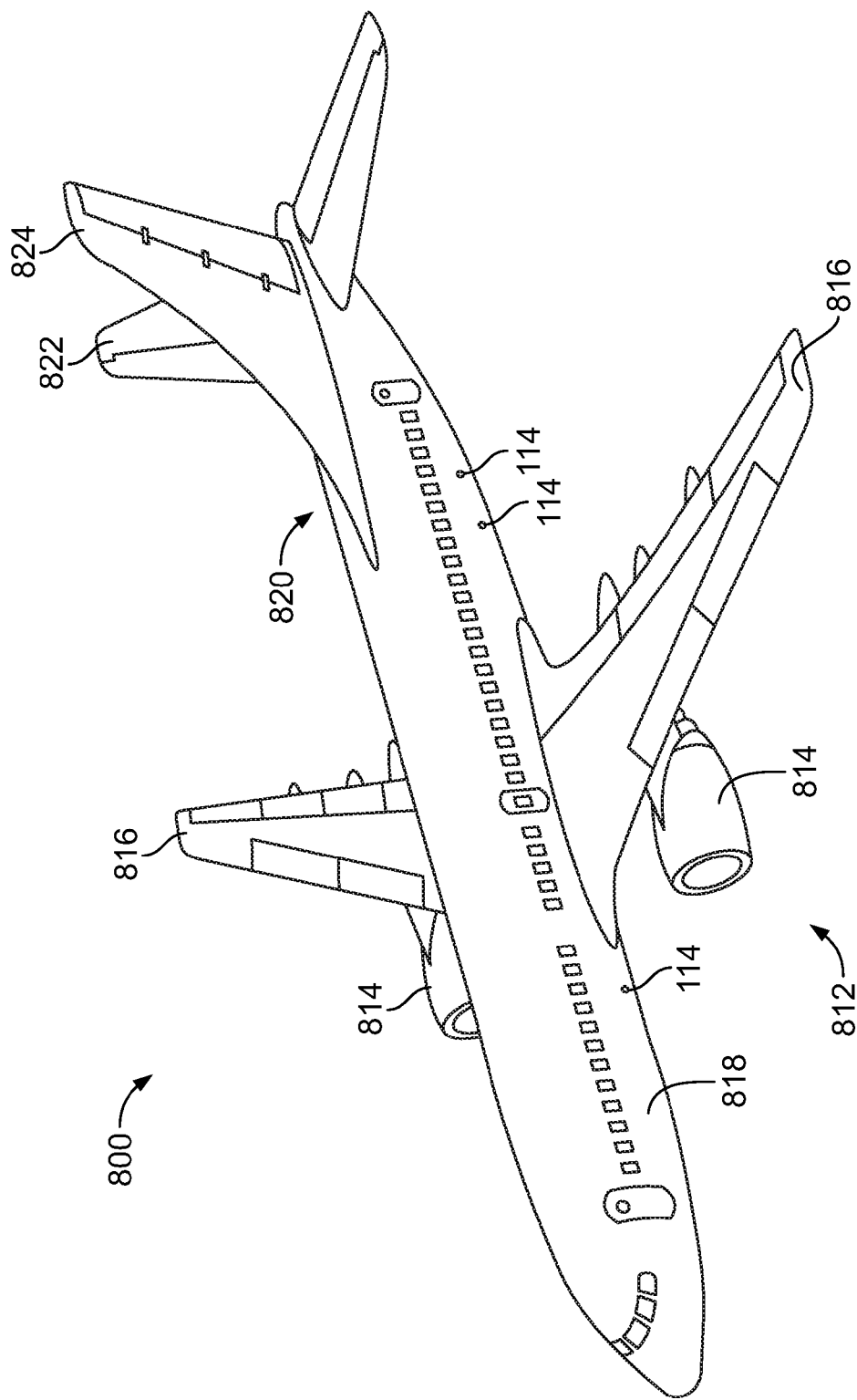
FIG. 8 illustrates a perspective top view of an aircraft, according to an embodiment of the present disclosure.

FIG. 8 illustrates a perspective top view of an aircraft 800, according to an embodiment of the present disclosure. The aircraft 800 includes a propulsion system 812 that may include two turbofan engines 814, for example. Optionally, the propulsion system 812 may include more engines 814 than shown. The engines 814 are carried by wings 816 of the aircraft 800. In other embodiments, the engines 814 may be carried by a fuselage 818 and/or an empennage 820. The empennage 820 may also support horizontal stabilizers 822 and a vertical stabilizer 824.

The fuselage 818 of the aircraft 200 defines an internal cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin. The internal cabin includes one or more chambers, such as lavatories, for example. One or more fluid removal systems 100 (shown and described with respect to FIGS. 1-3, for example) may be located within the internal cabin.

The exhaust ports 114, such as vents, may be formed in the fuselage. As such, fluids (for example, gases, such as air and ozone) may be drawn from confined spaces within the aircraft 800 through the fluid removal systems 100, and exhausted into an outside environment surrounding the aircraft 800, as described above.

Alternatively, instead of an aircraft, embodiments of the present disclosure may be used with various other vehicles, such as automobiles, buses, locomotives and train cars, watercraft, and the like. Further, embodiments of the present disclosure may be used with respect to fixed structures, such as commercial and residential buildings.

FIG. 9A illustrates a top plan view of an internal cabin 830 of an aircraft, according to an embodiment of the present disclosure. The internal cabin 830 may be within a fuselage 832 of the aircraft. For example, one or more fuselage walls may define the internal cabin 830. The internal cabin 830 includes multiple sections, including a front section 833, a first class section 834 (or first class suites, cabins, for example), a business class section 836, a front galley station 838, an expanded economy or coach section 840, a standard economy or coach section 842, and an aft section 844, which may include multiple confined spaces 102, such as lavatories and galley stations. Fluid removal systems 100 (shown in FIGS. 1-3, for example) may be located on or within the confined spaces 102. It is to be understood that the internal cabin 830 may include more or less sections than shown. For example, the internal cabin 830 may not include a first class section, and may include more or less galley stations than shown. Each of the sections may be separated by a cabin transition area 846, which may include class divider assemblies between aisles 848.

As shown in FIG. 9A, the internal cabin 830 includes two aisles 850 and 852 that lead to the aft section 844. Optionally, the internal cabin 830 may have more or less aisles than shown. For example, the internal cabin 830 may include a single aisle that extends through the center of the internal cabin 830 that leads to the aft section 844.

FIG. 9B illustrates a top plan view of an internal cabin 880 of an aircraft, according to an embodiment of the present disclosure. The internal cabin 880 may be within a fuselage 881 of the aircraft. For example, one or more fuselage walls may define the internal cabin 880. The internal cabin 880 includes multiple sections, including a main cabin 882 having passenger seats 883, and an aft section 885 behind the main cabin 882. It is to be understood that the internal cabin 880 may include more or less sections than shown.

The internal cabin 880 may include a single aisle 884 that leads to the aft section 885. The single aisle 884 may extend through the center of the internal cabin 880 that leads to the aft section 885. For example, the single aisle 884 may be coaxially aligned with a central longitudinal plane of the internal cabin 880.

One or more enclosed spaces 102, such as lavatories, may be located within the internal cabin 880. Fluid removal systems 100 shown in FIGS. 1-3, for example) may be located on or within the confined spaces 102.

Figure 10:
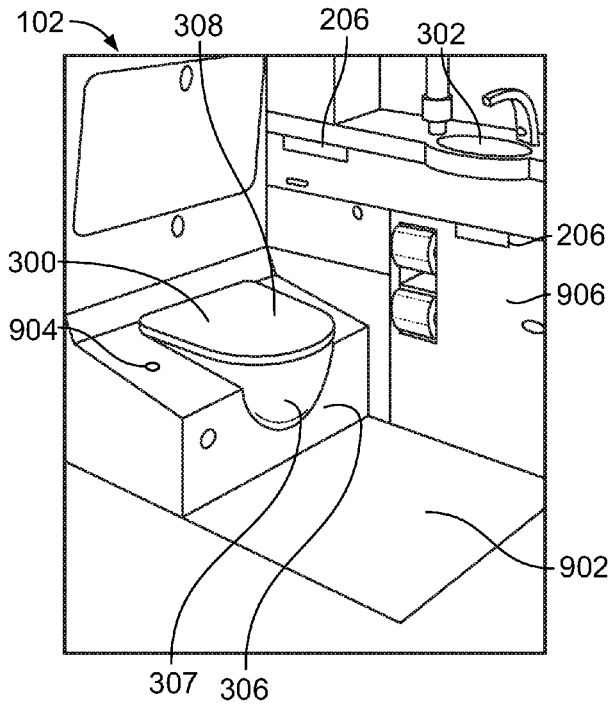
FIG. 10 illustrates a perspective internal view of a lavatory, according to an embodiment of the present disclosure.

FIG. 10 illustrates a perspective internal view of a lavatory 102, according to an embodiment of the present disclosure. As noted, the lavatory 102 is an example of the enclosed space 102 shown and described with respect to FIGS. 1-3, for example. The lavatory 102 may be onboard an aircraft, as described above. Optionally, the lavatory 102 may be onboard various other vehicles. In other embodiments, the lavatory 102 may be within a fixed structure, such as a commercial or residential building.

The lavatory 102 includes a base floor 902 that supports the toilet 300, cabinets 906, and the sink 302. UV light assemblies 206 are secured within the lavatory 102 and are configured to be activated during a sanitizing cycle to sanitize (for example, disinfect, sterilize, or otherwise clean) various structures within the lavatory 102, such as the toilet 300, the floor 902, the cabinets 906, and the sink 302. As shown, the toilet 300 includes a bowl 307, which may be a part of the housing 306. One or more ozone sensors 904 may be located within the lavatory 102. For example, an ozone sensor 904 may be mounted on the housing 306 of the toilet 304. Optionally, the lavatory 102 may not include an ozone sensor.

Figure 11:
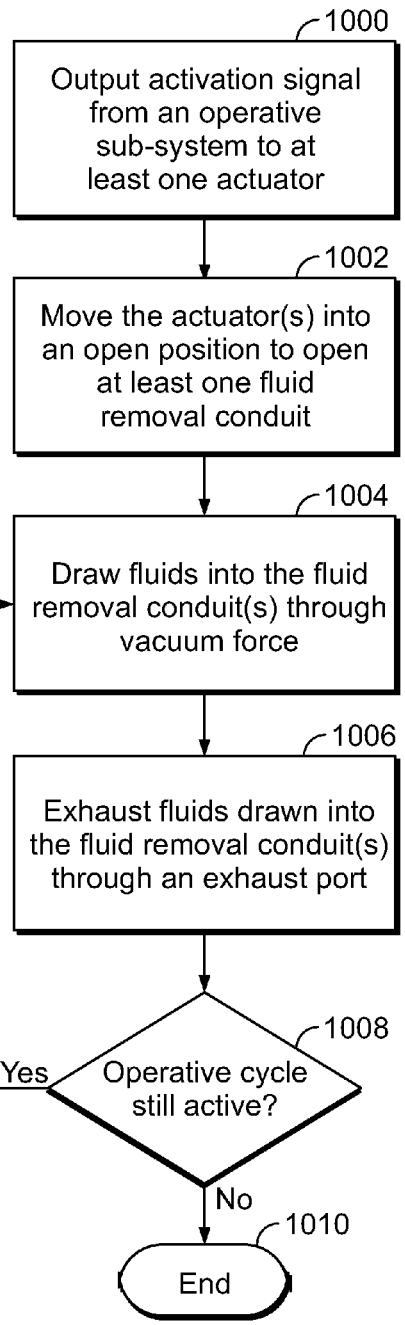
FIG. 11 illustrates a flow chart of a method of removing fluid from a confined space, according to an embodiment of the present disclosure.

FIG. 11 illustrates a flow chart of a method of removing fluid from a confined space, according to an embodiment of the present disclosure. Referring to FIGS. 1, 2, and 11, an activation signal is output from an operative sub-system 120. The activation signal is configured to activate and control at least one aspect of the operative sub-system 120 and is also configured to trigger one or more actuators into an open position. In at least one embodiment, the activation signal is configured to activate and control the operative sub-system 120 separately and distinctly from a fluid removal system. For example, the operative sub-system 120 may be the UV light sanitizing system 200, or the computer 204 shown in FIG. 2. In at least one embodiment, an activation signal of the operative sub-system 120 may be or include the opening signal. For example, the UV light control unit 208 may output an activation signal to the UV light assembly 206 to emit UV light during a sanitizing cycle. The activation signal may also be output to the actuator 122 and interpreted by the actuator 122 as the opening signal.

At 1002, upon receiving the activation signal, the actuator(s) 122 moves into an open position, thereby opening at least one fluid removal conduit 110. At 1004, fluids are drawn into the fluid removal conduit(s) 110 through vacuum force generated by the vacuum generator 112. At 1006, the fluid drawn into the fluid removal conduit(s) 110 is exhausted through the exhaust port 114.

At 1008, it is determined whether an operative cycle is still active. In at least one embodiment, the operative cycle is a sanitizing cycle of the UV light sanitizing system 200, as determined by the UV light control unit 208. As another example, the operative cycle may be a turbulence detection period as determined by the computer 204. As another example, the operative cycle may be a manual override ventilation cycle as initiated by an individual engaging the engagement member 202.

If the operative cycle is still active at 1008, the method proceeds to 1009, in which the actuator(s) 122 is maintained in the open position. The method then returns to 1004. If, however, the operative cycle has ceased at 1008, the method ends at 1010.

As described above, certain embodiments of the present disclosure provide systems and methods of limiting the amount of ozone within a confined space. Certain embodiments of the present disclosure provide systems and methods of ventilating ozone within a confined space. Certain embodiments of the present disclosure provide systems and methods that allow for a UV light to be separated from a structure to be sanitized, such that ozone generated by the interaction of emitted UV light with ambient air is quickly, effectively, and efficiently ventilated. Certain embodiments of the present disclosure provide systems and methods of removing various fluids (such as stale/malodorous air, ozone, liquids within a sink, and the like) from a confined space.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A fluid removal system configured to remove at least one fluid from a confined space, the fluid removal system comprising:
 at least one operative sub-system including an ultraviolet (UV) light sanitizing system that is configured to operate according to at least one operative cycle including a sanitizing cycle, wherein the at least one operative sub-system is configured to output at least one activation signal during the at least one operative cycle;
 an actuator operatively coupled to the at least one operative sub-system and moveably connected to a fluid removal conduit, wherein the fluid removal conduit is closed when the actuator is in a closed position, and opened when the actuator is in an open position, wherein the actuator moves into the open position in response to the at least one operative sub-system outputting the at least one activation signal, and wherein the at least one fluid within the confined space is drawn into the fluid removal conduit and exhausted through an exhaust port when the actuator is in the open position.

2. The fluid removal system of claim 1, further comprising a vacuum generator coupled to the fluid removal conduit, wherein the vacuum generator generates a vacuum that draws the at least one fluid within the confined space into the fluid removal conduit when the actuator is in the open position.

3. The fluid removal system of claim 1, wherein the actuator comprises a flush valve of a toilet.

4. The fluid removal system of claim 3, wherein the toilet is configured to be engaged by an individual to activate a wet flush in which a rinse valve and the flush valve are opened, and wherein only the flush valve is opened to provide a dry flush when the activation signal is output by the at least one operative sub-system.

5. The fluid removal system of claim 1, wherein the actuator comprises one or both of a solenoid or a motor coupled to one or both of a plunger and drain plug of a sink.

6. The fluid removal system of claim 1, wherein the at least one fluid comprises ozone within the confined space, and wherein the UV light sanitizing system includes:
 a UV light control unit that is configured to output the at least one activation signal; and
 a UV light assembly operatively coupled to the UV light control unit, wherein the UV light control unit controls the UV light assembly during the sanitizing cycle based on the at least one activation signal, and wherein the UV light assembly emits UV light to sanitize at least a portion of the confined space during the sanitizing cycle.

7. The fluid removal system of claim 6, further comprising an engagement member that is configured to be manually engaged by an individual, and wherein the at least one fluid further comprises malodorous air within the confined space.

8. The fluid removal system of claim 1, wherein the at least one operative cycle further comprises a turbulence detection period, wherein the at least one fluid further comprises water within the confined space, and wherein the at least one operative sub-system further comprises a computer onboard an aircraft.

9. A fluid removal method that removes at least one fluid from a confined space, the fluid removal method comprising:
 operating at least one operative sub-system including an ultraviolet (UV) light sanitizing system according to at least one operative cycle including a sanitizing cycle;
 outputting at least one activation signal from the at least one operative sub-system during the at least one operative cycle to an actuator that is operatively coupled to the at least one operative sub-system and moveably connected to a fluid removal conduit, wherein the fluid removal conduit is closed when the actuator is in a closed position, and opened when the actuator is in an open position;
 moving the actuator into the open position in response to the outputting; and
 drawing at least one fluid within the confined space into the fluid removal conduit when the actuator is in the open position.

10. The fluid removal method of claim 9, further comprising generating a vacuum with a vacuum generator that is coupled to the fluid removal conduit, wherein the generating the vacuum draws the at least one fluid within the confined space into the fluid removal conduit when the actuator is in the open position.

11. The fluid removal method of claim 9, wherein the actuator comprises a flush valve of a toilet.

12. The fluid removal method of claim 11, wherein the toilet is engageable by an individual to activate a wet flush in which a rinse valve and the flush valve are opened, and wherein only the flush valve is opened to provide a dry flush during the outputting.

13. The fluid removal method of claim 9, wherein the actuator comprises one or both of a solenoid or a motor coupled to one or both of a plunger and drain plug of a sink.

14. The fluid removal method of claim 9, wherein the at least one fluid comprises ozone within the confined space, and wherein the UV light sanitizing system includes:
 a UV light control unit that is configured to output the at least one activation signal; and
 a UV light assembly operatively coupled to the UV light control unit, wherein the UV light control unit controls the UV light assembly during the sanitizing cycle based on the at least one activation signal, and wherein the UV light assembly emits UV light to sanitize at least a portion of the confined space during the sanitizing cycle.

15. The fluid removal method of claim 14, further comprising manually engaging an engagement member to cause the moving, and wherein the at least one fluid further comprises malodorous air within the confined space.

16. The fluid removal method of claim 9, wherein the at least one operative cycle further comprises a turbulence detection period, wherein the at least one fluid further comprises water within the confined space, and wherein the at least one operative sub-system further comprises a computer onboard an aircraft.

17. A vehicle comprising:
 an internal cabin;
 a lavatory within the internal cabin, wherein the lavatory comprises a toilet and a sink, wherein the toilet is configured to be engaged by an individual to activate a wet flush in which a rinse valve and a flush valve are opened;
 at least one fluid removal conduit coupled to one or both of the toilet and the sink;
 a vacuum generator coupled to the at least one fluid removal conduit, wherein the vacuum generator is configured to generate a vacuum within the at least one fluid removal conduit;

an ultraviolet (UV) light assembly within the lavatory, wherein the UV light assembly is configured to emit UV light into or onto one or both of the toilet or the sink during a sanitizing cycle;

a UV light control unit coupled to the UV light assembly, wherein the UV light control unit outputs an activation signal that activates and controls the UV light assembly during the sanitizing cycle;

at least one actuator operatively coupled to the UV light control unit and moveably connected to the at least one fluid removal conduit, wherein the at least one fluid removal conduit is closed when the at least one actuator is in a closed position, and opened when the at least one actuator is in an open position, wherein the at least one actuator moves into the open position in response to the UV light control unit outputting the activation signal, wherein fluid within the lavatory is drawn into the at least one fluid removal conduit when the at least one actuator is in the open position, and wherein the vacuum generator draws the fluid within the lavatory into the at least one fluid removal conduit when the actuator is in the open position; and an exhaust port coupled to the at least one fluid removal conduit, wherein the fluid drawn into the at least one fluid removal conduit is exhausted out of the vehicle through the exhaust port.

18. The vehicle of claim 17, wherein the at least one actuator comprises the flush valve of the toilet, wherein only the flush valve is opened to provide a dry flush when the activation signal is output by the UV light control unit.

19. The vehicle of claim 17, wherein the at least one actuator comprises one or both of a solenoid or a motor coupled to one or both of a plunger and drain plug of the sink.

20. The vehicle of claim 17, further comprising an engagement member that is configured to be manually engaged by an individual, and wherein the fluid further comprises malodorous air within the lavatory.

21. A fluid removal system configured to remove fluid from a confined space, the fluid removal system comprising:

an operative sub-system that is configured to operate according to an operative cycle, wherein the operative sub-system is configured to output an activation signal during the operative cycle;

an actuator operatively coupled to the operative sub-system and moveably connected to a fluid removal conduit, wherein the actuator comprises one or both of a solenoid or a motor coupled to one or both of a plunger and drain plug of a sink, wherein the fluid removal conduit is closed when the actuator is in a closed position, and opened when the actuator is in an open position, wherein the actuator moves into the open position in response to the operative sub-system outputting the activation signal, and wherein a fluid within the confined space is drawn into the fluid removal conduit and exhausted through an exhaust port when the actuator is in the open position.

22. A fluid removal method that removes fluid from a confined space, the fluid removal method comprising:

operating an operative sub-system according to an operative cycle;

outputting an activation signal from the operative sub-system during the operative cycle to an actuator that is operatively coupled to the operative sub-system and moveably connected to a fluid removal conduit, wherein the actuator comprises one or both of a solenoid or a motor coupled to one or both of a plunger and drain plug of a sink, wherein the fluid removal conduit is closed when the actuator is in a closed position, and opened when the actuator is in an open position;

moving the actuator into the open position in response to the outputting; and drawing fluid within the confined space into the fluid removal conduit when the actuator is in the open position.

* * * * *